Patented Nov. 20, 1934

1,981,168

UNITED STATES PATENT OFFICE 1,981,168

TREATMENT OF RUBBER

Roscoe H. Gerke, Nutley, N. J., assignor to Morgan & Wright, Detroit, Mich., a corporation of Michigan No Drawing. Application August 11, 1932,
Serial No. 628,296

15 Claims. (Cl. 106—23)

This invention relates to improvements in the plastication of rubber.

An object of this invention is to provide a method of increasing the rate of breakdown of crude rubber during mastication by means of the usual masticating machinery. Another object is to provide a process whereby a softer broken down rubber may be produced in a given time by mastication than is possible under the usual conditions for mastication. Another object is to provide a process of breaking down crude rubber whereby substantial savings in time, labor, power consumption, and equipment costs may be realized. A further object is to provide a process whereby the output of a given masticating equipment may be substantially increased. A still further object is to provide a softened or broken-down crude rubber having desirable physical properties. Other objects will be apparent from the following description.

It is customary to plasticize crude rubber on a roll mill or in an internal grinder before mixing in the compounding ingredients, such as fillers, pigments, and vulcanizing ingredients such as accelerators, sulphur, etc. The operation normally requires from 30–40 min. to several hours, depending on the softness desired, and is carried out either continuously, or intermittently with intervening rest periods. So called "softeners" such as fatty acids, oils, and tars, usually considered indispensable in factory compounding, when added to crude rubber on the mill actually decrease the degree of breakdown which can be produced in a given length of time, and in many cases, such as tire tread stocks, it has been found that oils such as palm oil and pine tar produce decreased resistance to abrasion of the vulcanized tread. The main purpose of such "softeners" is to facilitate the incorporation of dry fillers, and to facilitate subsequent calendering or tubing operations, by virtue of their lubricating properties. Further, rubber broken down in the usual manner and compounded with fillers and oils etc. tends to harden upon standing and hence in many cases is "cracked" or broken down a second time before further processing. This hardening effect is due to the thixotropic nature of the mass and is distinct from the hardening due to cooling of the rubber. Thixotropic hardening of the rubber stock is substantially avoided by the present invention.

It has recently become known that lead dioxide is a good plasticizing reagent to help break down crude rubber during the preliminary mastication period. It has now been found that when an organic acid anhydride is used along with the lead dioxide, the rate of breakdown can be increased by as much as 25% over that obtained by the use of the lead dioxide alone. The anhydride when used alone does not substantially affect the rate of breakdown.

The reagent is incorporated in the rubber, substantially as soon as it has been masticated to a coherent mass or sheet, which condition is usually reached after a few minutes of preliminary mastication. Mastication is continued after adding the reagent or reagents, or the further mastication may be delayed until further processing of the rubber is desired. Generally, the compounding and/or vulcanizing ingredients should not be added until the rubber has reached the desired degree of softness. Certain materials tend to destroy the plasticizing powers of the reagents and should not be added to the rubber during the breakdown; for example, sulphur readily reacts upon the lead dioxide to destroy its plasticizing action.

In order to obtain the benefits of the invention, such as reduced power demands, to the fullest degree, it is preferable also to carry out the preliminary working of the rubber, prior to the incorporation of the breakdown-accelerating reagent, on or in a preheated mill rather than to start with a "cold" mill. Under the conditions of the present process, the reagents react in an unknown manner during the plasticizing process and become decomposed thereby. The lead dioxide becomes reduced during the process, most probably to the divalent stage represented by lead monoxide or corresponding lead salts, while the acid anhydride becomes converted at least in part into the corresponding acid or salts thereof.

The plasticities given in the examples below represent the relative viscosities of the respective rubber samples and were determined by measuring the relative resistance of the samples to simple shearing stress at a constant average rate of shear and at a temperature of 212° F.

The following examples are given to illustrate the practice of the invention, the parts and percentages being by weight:

*Example 1.*—A quantity of unbroken down smoked sheets was blended on a cold mill for 3 minutes, after which the plasticity of a representative sample was found to be 71.0. To a 400-gram portion of this rubber was added a small quantity of lead dioxide and phthalic anhydride and the rubber milled for 8 minutes at 200° F. Another portion of the rubber, to which no reagents were added, was milled under the same conditions as a control. The plasticities measured immediately after the milling are given in Table I.

Table I

|  | Plasticity after 8' milling at 200° F. |
|---|---|
| Control | 66 |
| Control plus 0.5 percent lead dioxide and 0.33 percent phthalic anhydride based on the rubber | 49 |

It will be noted that the decrease in viscosity of the treated portion was 4.4 times greater than that of the control portion under the same conditions of milling.

*Example 2.*—In this example the procedure followed was similar to that of Example 1. Four portions of rubber were used, consisting of a control, two portions to which lead dioxide, and phthalic anhydride, respectively, were added, and a fourth portion to which both lead dioxide and phthalic anhydride were added. The plasticity data in the following table clearly show the new result attained by the combined use of the two materials.

Table II

|  |  | Plasticity |  |  |  |
|---|---|---|---|---|---|
|  |  | Time of milling (minutes) | | | |
|  |  | 0 | 4 | 8 | 12 |
| 1. control |  | 77.5 | 68.0 | 64.5 | 64.5 |
| 2. lead dioxide | 0.5% | 77.5 | 65.5 | 62.5 | 59.0 |
| 3. phthalic anhydride | 0.33% | 77.5 | 67.5 | 63.5 | 63.5 |
| 4. lead dioxide + phthalic anhydride | 0.5% / 0.33% | 77.5 | 64.0 | 60.5 | 58.5 |

*Example 3.*—Two hundred pounds of pale crepe was divided into six equal portions and broken down for 3 minutes on a 30-inch mill. These portions were then combined into two lots by taking one-half of each of the six batches which had been broken down and blending. To the first lot (A) was added 0.5 percent of lead dioxide and 0.33 percent of phthalic anhydride, based on the rubber; the second lot (B) was used as a control. Each of these lots was then milled for 30 minutes on a 30-inch mill with the rolls at a temperature of 150° C. at the start of the milling. The plasticity measurements made at 6-minute intervals during the 30 minutes of milling are shown in Table II.

Table III

| Minutes on mill | Plasticity | |
|---|---|---|
|  | A | B |
| 0 | 79 | 79 |
| 6 | 75.5 | 74 |
| 12 | 66.5 | 70.5 |
| 18 | 64.5 | 72.0 |
| 24 | 61.5 | 71.5 |
| 30 | 59.5 | 70.5 |
| After standing 4 days | 57.5 | 77–79 |

It will be noted that the control B after standing 4 days following the milling, exhibited substantially the same hardness it showed before the milling; while the treated rubber A not only did not recover any of its initial hardness but actually showed some tendency to become softer on standing.

*Example 4.*—Two 250-pound batches of smoked sheet were prepared by taking portions from several bales and running them once through a cracking mill. The first batch was used as a control. The second batch was milled for 3 minutes in a No. 9 Banbury mixer, and to it was then added 0.5 percent of lead dioxide and 0.4 percent of phthalic anhydride. Each of the two batches was then broken down by grinding in the Banbury mixer for a total of 17 minutes (including the initial 3-minute milling period in the case of the second batch) followed by 15 minutes of milling on an 84-inch roll mill. The plasticity measurements on samples taken at the end of the Banbury treatment and at 5-minute intervals during the subsequent milling on the roll mill are given in Table III.

|  | A | B |  |
|---|---|---|---|
| Control | Lead dioxide | 0.5% | |
|  | Phthalic anhydride | 0.4% | |
|  | Plasticity | |
| After 17 minutes in Banbury | 73 | 66 |
| After additional 5' on mill | 72 | 64 |
| After additional 10' on mill | 72 | 62 |
| After additional 15' on mill | 73 | 62 |

The treated rubber B of Example 3, after 10 minutes of milling on the roll mill, was substantially as soft as the rubber obtained by fine grinding of untreated rubber for two hours on a cold mill according to common practice.

*Example 5.*—Two tread stocks were prepared, for the addition of the usual compounding ingredients, under identical milling conditions and having similar compositions, except that regular smoked sheet rubber broken down on the mill in the usual manner was used in the control stock A, while the same kind of rubber treated with 0.5 percent of lead dioxide and 0.33 percent of phthalic anhydride added during the breakdown was used in stock B; also, stock A contained as "softeners" 5 percent of pine tar and 1 percent of palm oil by weight on the rubber, while no pine tar nor palm oil was added to stock B. Slabs from each of the resulting mixes were vulcanized in the usual manner.

|  | A | B |
|---|---|---|
| Broken-down rubber, ordinary | 100 |  |
| Rubber broken down by the new process |  | 100.83* |
| Carbon black | 50 | 50 |
| Pine tar | 5 |  |
| Palm oil | 1 |  |
| Zinc oxide | 2 | 2 |
| Zinc soaps of cocoanut oil acids | 3 | 3 |
| Antioxidant | 1.25 | 1.25 |
| Accelerator | 1.5 | 1.5 |
| Sulphur | 3.5 | 3.5 |

(*The extra 0.83 is the weight of the chemical reagents added.)

| | A | B |
|---|---|---|
| Plasticity of rubber just prior to compounding | 81 | 60 |
| Plasticity of finished mix | 54.5 | 54 |
| Relative resistance to abrasion (average of 45' 60' 75' and 90' cures at 45#) | 75 | 105 |

Advantages shown by this example are that (1) "softeners" such as pine tar and palm oil may be eliminated in whole or in part which fact is conducive to increased resistance to abrasion in the vulcanized products and (2) mixes containing the chemical plasticizing reagents are more plastic, just prior to the usual compounding operation, and hence require much less further milling with the fillers etc. and less time and power than the usual stock as represented by A, to bring it to a desired condition of plasticity suitable for calendering or tubing operations.

*Example 6.*—This example illustrates the use of various organic acid anhydrides in combination with lead dioxide according to the invention. Six portions of blended unbroken-down rubber were provided as in Example 1, the initial plasticity being 74.5. To five of the portions were then added lead dioxide and an acid anhydride in the proportions shown in the table, the sixth portion being used as a control. The six portions were then each milled for 8 minutes at a roll temperature of 200° F., and the respective plasticities determined.

| Acid anhydride | PbO$_2$ | Plasticity after 8' milling |
|---|---|---|
| A. Phthalic 0.33% | 0.5% | 63.0 |
| B. Acetic 0.2 | 0.5 | 65.0 |
| C. Succinic 0.2 | 0.5 | 60.5 |
| D. Maleic 0.2 | 0.5 | 56.0 |
| E. Benzoic 0.5 | 0.5 | 49.5 |
| F. None (control) | | 67.5 |

The amount of lead dioxide employed is preferably from 0.25 to 1.0% of the weight of the rubber, with a corresponding amount of the acid anhydride. The lead dioxide and the organic acid anhydride are preferably employed in amounts which are substantially equi-molecular, or approximately so, as shown in the above examples, although as little as 0.1% of acid anhydride has been found effective in combination with 0.5% of lead dioxide.

The invention is applicable to all commercial types of crude rubber, being particularly advantageous in the treatment of the higher grades of rubber, such as pale crepe, brown crepe, smoked sheet, spray dried rubbers, etc.

With the detailed disclosure above given, it is obvious modifications will suggest themselves, without departing from the principle of the invention, and it is not desired to limit the invention otherwise than as set forth in the appended claims.

Having thus described my invention, what I claim and desire to protect by Letters Patent is:

1. A method of plasticizing rubber which comprises incorporating in solid rubber during the preliminary breakdown period a small amount of lead dioxide and a small amount of an organic acid anhydride.

2. A method of plasticizing rubber which comprises incorporating in solid rubber during the preliminary breakdown period a small amount of lead dioxide and a small amount of an anhydride of an aromatic acid.

3. A method of plasticizing rubber which comprises incorporating in solid rubber during the preliminary plasticizing period a small amount of lead dioxide and a small amount of an anhydride of a di-basic aromatic acid of the benzene series.

4. A method of plasticizing rubber which comprises incorporating in solid rubber during the preliminary breakdown period a small amount of lead dioxide and a small amount of phthalic anhydride.

5. A method of plasticizing rubber which comprises masticating crude rubber until it forms a coherent mass or sheet, adding thereto prior to the incorporation of the usual compounding and/or vulcanizing ingredients a small amount of lead dioxide and a small amount of an organic acid anhydride and further masticating the rubber in the absence of said compounding and/or vulcanizing ingredients.

6. A method of plasticizing rubber which comprises masticating crude rubber until it forms a coherent mass or sheet, adding thereto prior to the incorporation of the compounding and/or vulcanizing ingredients a small amount of lead dioxide and a small amount of an anhydride of an aromatic acid and further masticating the rubber in the absence of said compounding and/or vulcanizing ingredients.

7. A method of plasticizing rubber which comprises masticating crude rubber until it forms a coherent mass or sheet, adding thereto prior to the incorporation of the usual compounding and/or vulcanizing ingredients a small amount of lead dioxide and a small amount of an anhydride of a di-basic aromatic acid of the benzene series and further masticating the rubber in the absence of said compounding and/or vulcanizing ingredients.

8. A method of plasticizing rubber which comprises masticating crude rubber until it forms a coherent mass or sheet, adding thereto prior to the incorporation of the usual compounding and/or vulcanizing ingredients a small amount of lead dioxide and a small amount of phthalic anhydride and further masticating the rubber in the absence of said compounding and/or vulcanizing ingredients.

9. A method which comprises incorporating in solid rubber during the preliminary breakdown period a small amount of lead dioxide and a small amount of an organic acid anhydride, thereafter mixing with the so treated rubber the usual compounding and vulcanizing ingredients, and vulcanizing.

10. A softened crude rubber adapted for use in the usual operations of compounding, calendering or tubing, and vulcanizing, and resulting from the process set forth in claim 1, and characterized in that it contains small amounts of combined lead and of an organic acid naturally foreign to rubber, which rubber is substantially free of lead dioxide and has substantially no tendency to undergo thixotropic hardening after being subjected to mastication.

11. A process of treating rubber whereby to increase its rate of break-down during the preliminary period of plasticizing the rubber which comprises working into the rubber during said period a small amount of lead dioxide and a small amount of an organic acid anhydride and plasticizing the rubber to a soft plastic condition, prior to the time of mixing in the usual compounding and/or vulcanizing ingredients.

12. A process of treating rubber whereby to increase its rate of break-down during the preliminary period of plasticizing the rubber which comprises working into the rubber during said period a small amount of lead dioxide and a small amount of an organic acid anhydride having the properties of phthalic anhydride in increasing the rubber breakdown effect of lead dioxide, and plasticizing the rubber to a soft plastic condition, prior to the time of mixing in the usual compounding and/or vulcanizing ingredients.

13. A method of plasticizing rubber which comprises incorporating in solid rubber during the preliminary breakdown period a small amount of lead dioxide and a small amount of an organic acid anhydride having the properties of phthalic anhydride in increasing the rubber break-down effect of lead dioxide.

14. A process of treating rubber whereby to increase its rate of break-down during the preliminary period of plasticizing the rubber which comprises working into the rubber during said period a small amount of lead dioxide and a small amount of an organic acid anhydride having the property of a member of the group consisting of phthalic anhydride, acetic anhydride, succinic anhydride, maleic anhydride, benzoic anhydride, in increasing the rubber break-down effect of lead dioxide, and plasticizing the rubber to a soft plastic condition, prior to the time of mixing in the usual compounding and/or vulcanizing ingredients.

15. A method of plasticizing rubber which comprises incorporating in solid rubber during the preliminary break-down period a small amount of lead dioxide and a small amount of an organic acid anhydride having the property of a member of the group consisting of phthalic anhydride, acetic anhydride, succinic anhydride, maleic anhydride, benzoic anhydride, in increasing the rubber break-down effect of lead dioxide.

ROSCOE H. GERKE.